US011365655B2

(12) United States Patent
Girondi

(10) Patent No.: US 11,365,655 B2
(45) Date of Patent: Jun. 21, 2022

(54) VALVE GROUP FOR OIL FILTERING ASSEMBLY

(71) Applicant: UFI FILTERS S.p.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 805 days.

(21) Appl. No.: 16/074,613

(22) PCT Filed: Feb. 1, 2017

(86) PCT No.: PCT/IB2017/050535
§ 371 (c)(1),
(2) Date: Aug. 1, 2018

(87) PCT Pub. No.: WO2017/134571
PCT Pub. Date: Aug. 10, 2017

(65) Prior Publication Data
US 2019/0063275 A1    Feb. 28, 2019

(30) Foreign Application Priority Data
Feb. 4, 2016 (IT) .......................... 102016000011627

(51) Int. Cl.
*F01M 11/03* (2006.01)
*F01M 5/00* (2006.01)
(Continued)

(52) U.S. Cl.
CPC ............ *F01M 5/007* (2013.01); *F01M 11/03* (2013.01); *F16N 39/06* (2013.01); *F01M 2011/033* (2013.01); *F01P 2011/061* (2013.01)

(58) Field of Classification Search
CPC ... F01M 5/007; F01M 11/03; F01M 2011/033
See application file for complete search history.

(56) References Cited

U.S. PATENT DOCUMENTS 4,512,300 A    4/1985  Devore et al.
6,267,094 B1*  7/2001  Kuettner .................. F01M 1/02
                                              123/196 A
(Continued)

FOREIGN PATENT DOCUMENTS

DE    10 2010 034788 A1    2/2012
EP     0 295 466 A2       12/1988
(Continued)

OTHER PUBLICATIONS

International Search Report and Written Opinion of the International Searching Authority for International Patent Application No. PCT/IB2017/050535 dated Jun. 6, 2017, 9 pages.

*Primary Examiner* — Michael R Mansen
*Assistant Examiner* — Mark K Buse
(74) *Attorney, Agent, or Firm* — Merchant & Gould P.C.

(57) ABSTRACT

A valve group (10) is housed in a duct (40) of a support body (4) of an oil filtering assembly provided with a valve body (11) fixed to the support body (4). An obturator (15) is fitted in an axially movable manner on the valve body (11) and includes an obturator positioner and mover (18). The obturator (15) is movable by the obturator positioner and mover (18) as a function of the oil temperature values respectively in a first, a second and a third operating configuration, in which the oil is cooled, heated, for example by a heat exchanger, or sent directly to the filtering device. Moreover, the obturator (15) is movable by the obturator positioner and mover (18) as a function of the oil pressure values directly to the filtering device, preventing oil access to the heat exchanger.

16 Claims, 12 Drawing Sheets

(51) Int. Cl.
*F16N 39/06* (2006.01)
*F01P 11/06* (2006.01)

(56) References Cited

U.S. PATENT DOCUMENTS

| | | | |
|---|---|---|---|
| 2006/0081361 A1* | 4/2006 | Gabbey | F28F 19/01 |
| | | | 165/119 |
| 2013/0153475 A1* | 6/2013 | Jainek | F01M 11/03 |
| | | | 210/149 |

FOREIGN PATENT DOCUMENTS

| | | |
|---|---|---|
| EP | 1 752 627 A2 | 2/2007 |
| EP | 1 752 628 A1 | 2/2007 |
| EP | 2 305 360 A1 | 4/2011 |
| WO | 2012/028914 A1 | 3/2012 |

* cited by examiner

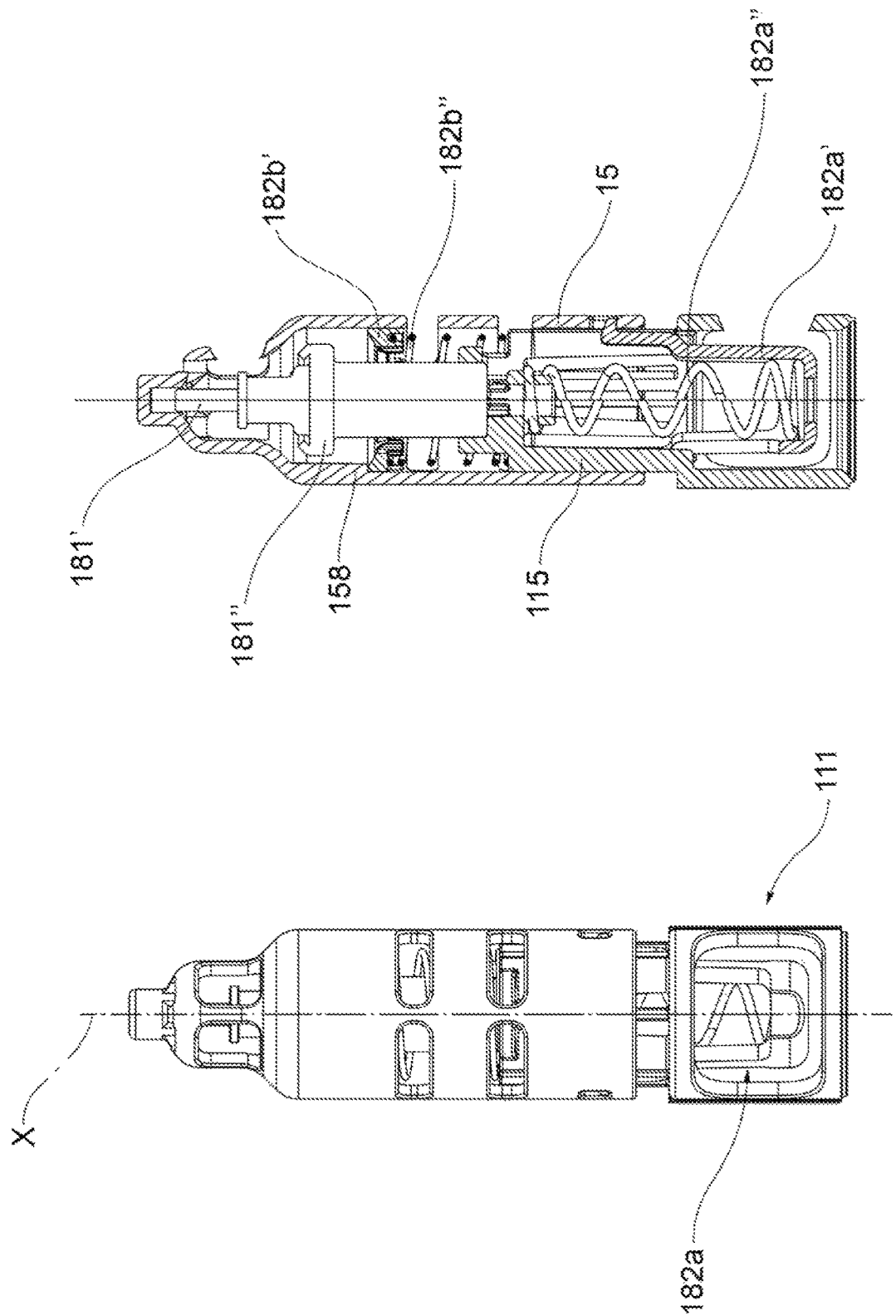

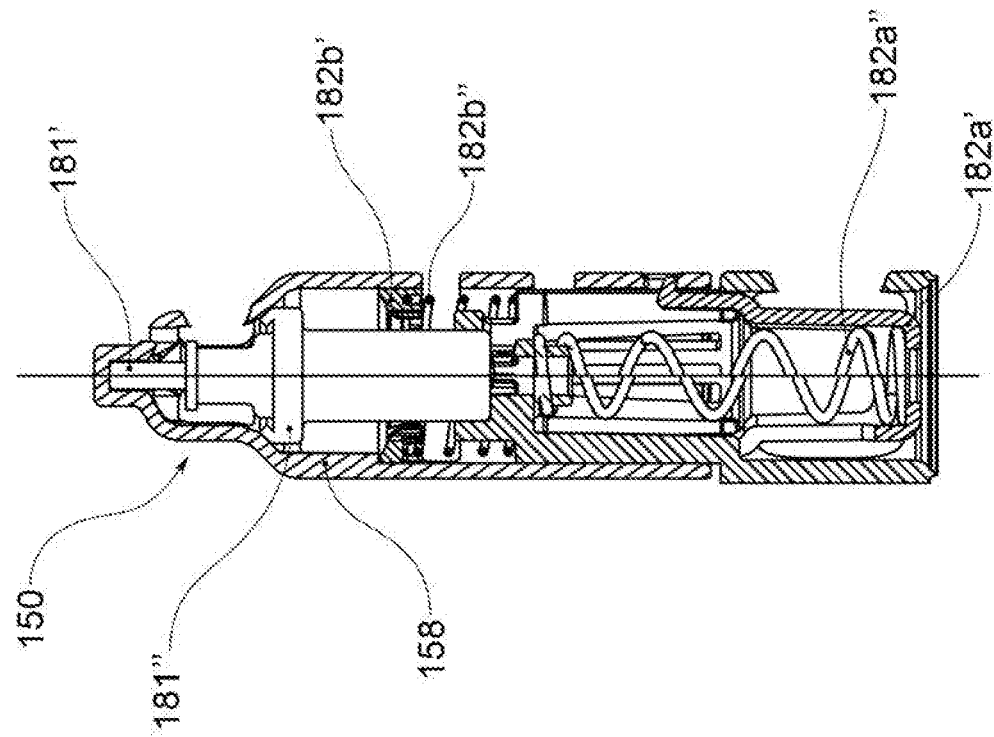
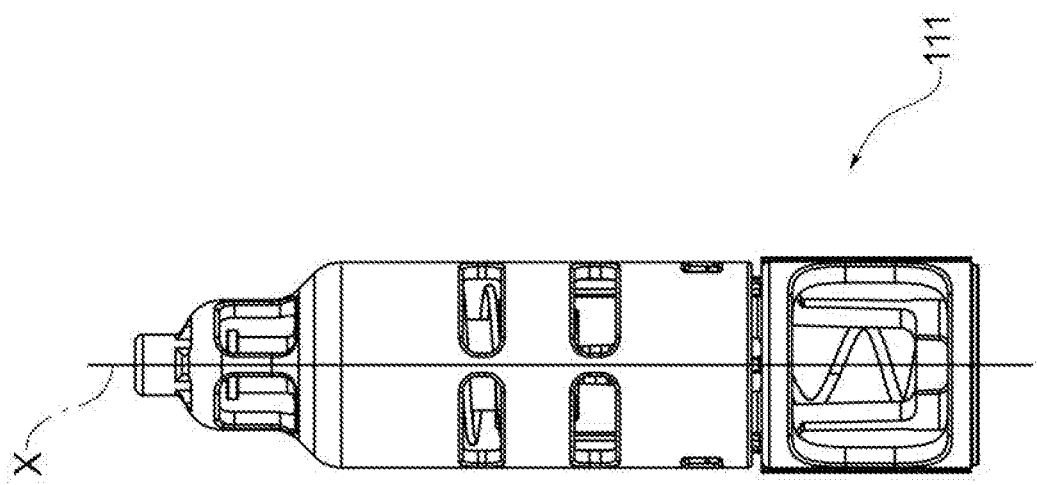
FIG.2b
FIG.2a

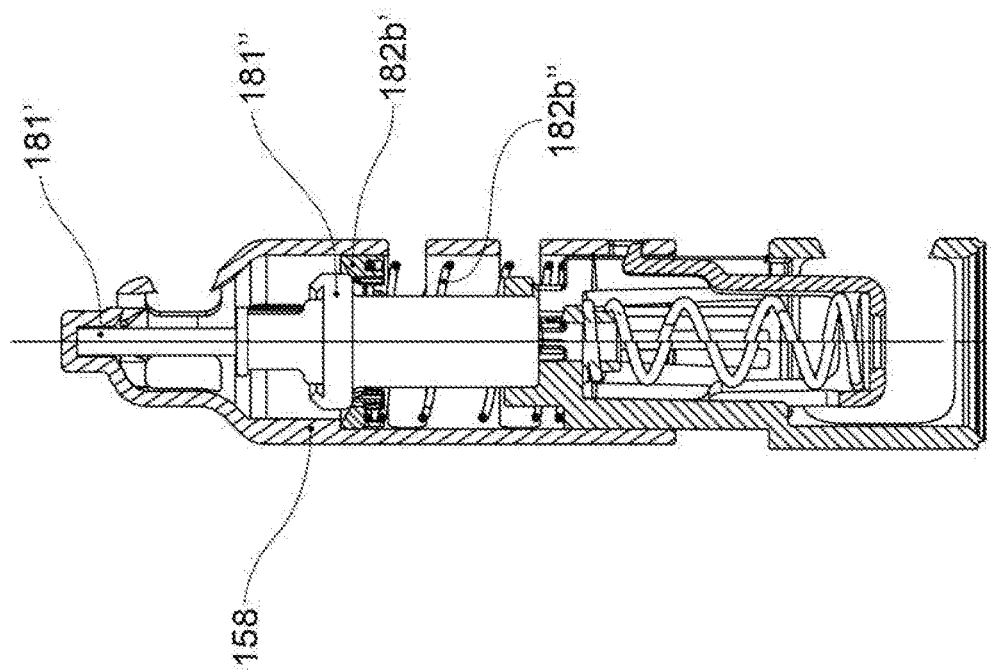
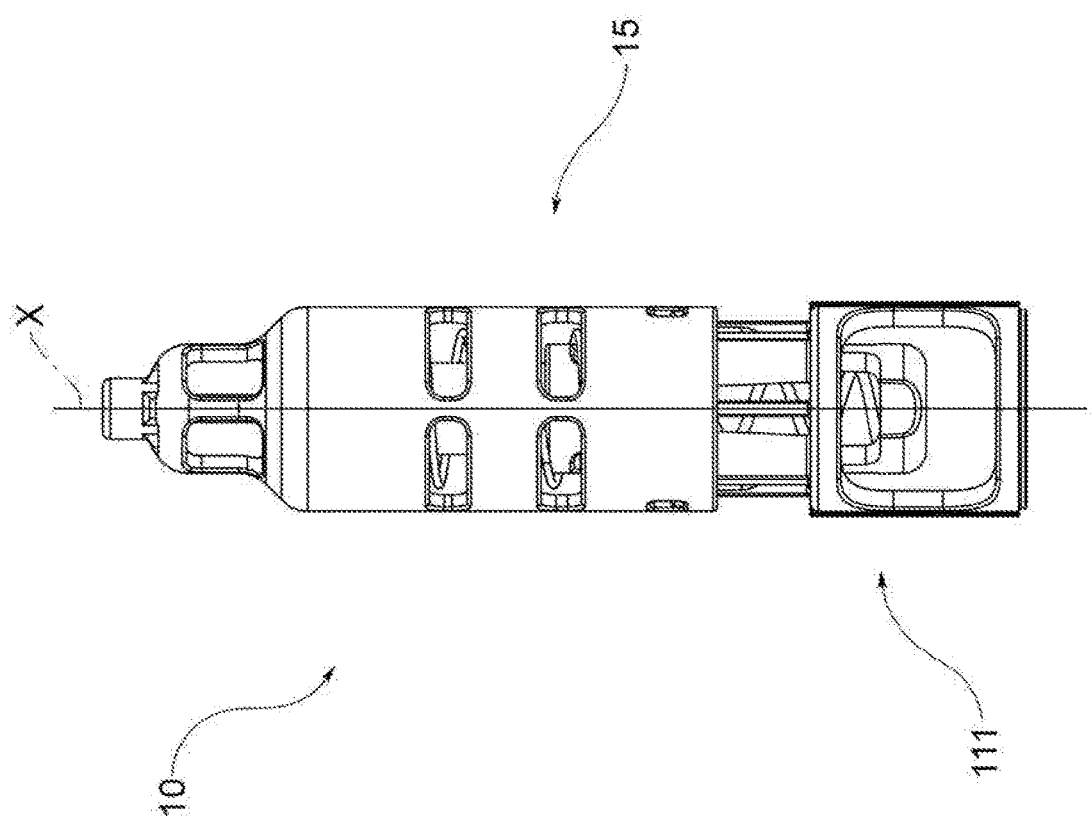

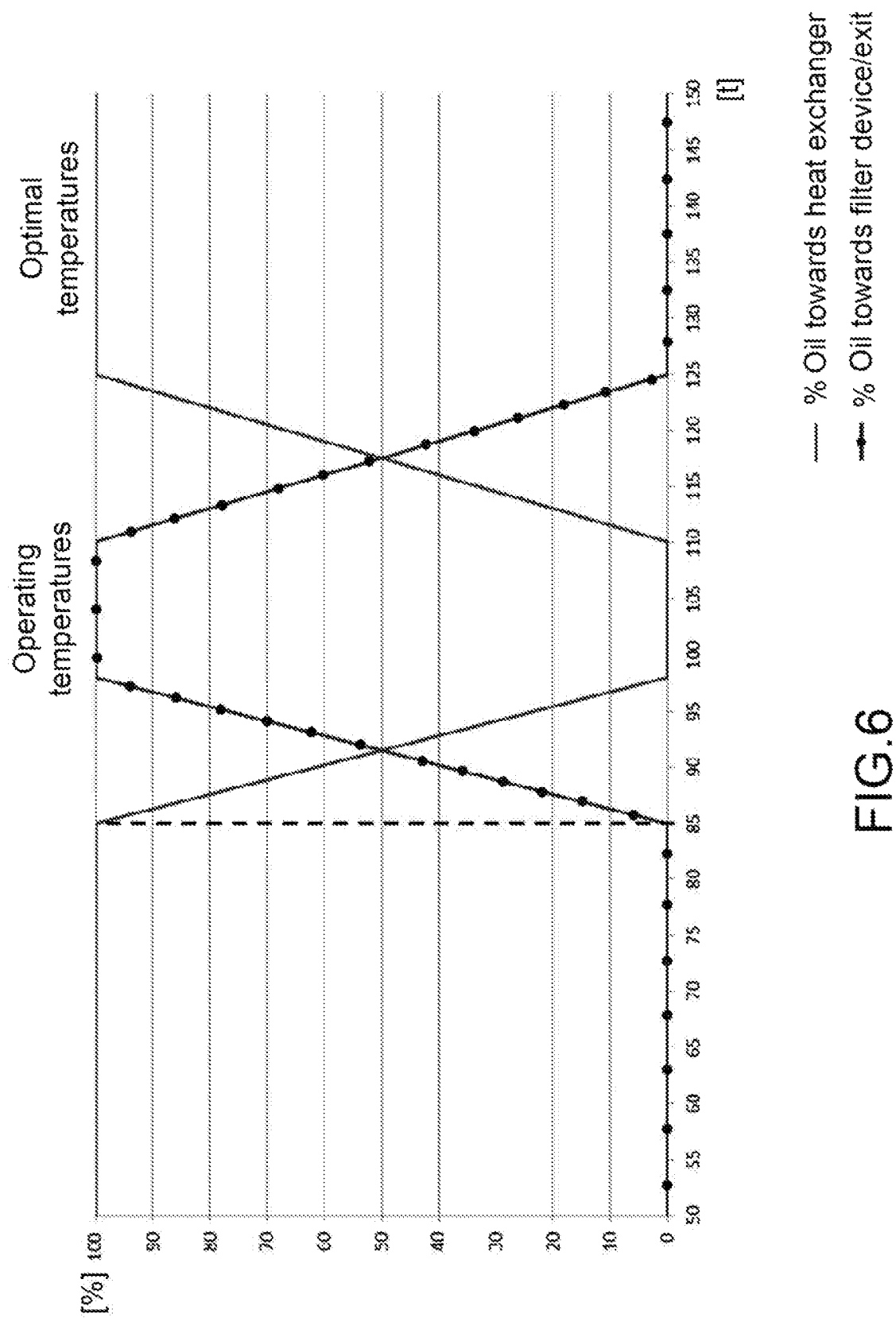

VALVE GROUP FOR OIL FILTERING ASSEMBLY

This application is a National Stage Application of PCT/IB2017/050535, filed 1 Feb. 2017, which claims benefit of Serial No. 102016000011627, filed 4 Feb. 2016 in Italy, and which applications are incorporated herein by reference. To the extent appropriate, a claim of priority is made to each of the above-disclosed applications.

FIELD OF APPLICATION

The present invention relates to an oil filtering assembly for filtering a predefined quantity of oil in the engine of a vehicle. Moreover, the present invention relates to a valve group adapted to be part of an oil filtering assembly.

BACKGROUND ART

Solutions for oil filtering assemblies are known in the prior art which are associable to the engine of a vehicle, in fluidic connection with the engine oil circulation circuit, adapted to perform filtering and cleaning operations of a predefined quantity of oil by means of special filtering devices comprised therein.

Such assemblies are adapted to operate in different operating conditions as a function of the engine operating modes; for example, in such operating conditions, the filtering assemblies are adapted to cause a change in the oil temperature.

For example, in order to improve the heating step of the engine, to which the filtering assemblies are operatively connected, the oil flowing therein is heated, preferably by means of a heat exchanger. In fact, oil filtering assemblies are known which comprise, typically upstream of the filtering device, a heat exchanger through which the oil is heated or cooled as a function of the requirements of the engine and/or of the filtering device itself. Such filtration assemblies are in fact adapted to bring the oil temperature to a higher value when it is detected to be too low as a function of the requirements, and vice versa to a lower value when it is detected to be too high, typically by controlling the flow thereof through a heat exchanger.

In order to manage the oil control towards the heat exchanger or to the filtering device, such assemblies have been provided with valve groups adapted to control the passage of fluid in the heat exchanger or directly to the filtering device according to the temperature of the oil.

Known filtering assembly solutions therefore are particularly complex, specifically in the valve group solution and in its management of the oil flow control.

In addition, known filtering assembly solutions fail to manage any oil pressure peaks from the engine. The presence of such pressure peaks is particularly undesirable because it causes accelerated wear of the valve group or of further components of the circuit in which the oil flows upstream thereof, or of the heat exchanger, thus affecting the useful life of the filtering assembly.

An example of an embodiment of filtering assembly exhibiting such a drawback is shown in document EP1752628.

SOLUTION OF THE INVENTION

The need to provide an oil filtering assembly is therefore strongly felt which is adapted to ensure an optimal temperature of the oil towards the vehicle engine, such as in input to the filtering device by means of a heat exchanger, but that at the same time is adapted to solve the above drawback related to the presence of high oil pressure peaks.

The object of the present invention is to provide an oil filtering assembly adapted to manage the incoming oil temperature by the passage through a heat exchanger, and which is also able to prevent the latter from undergoing accelerated wear in the presence of pressure peaks.

Such an object is achieved by the valve group claimed in claim 1 and by the oil filtering assembly comprising said valve group according to claim 15. The dependent claims describe preferred embodiment variants involving further advantageous aspects.

DESCRIPTION OF THE DRAWINGS

Further features and advantages of the invention will be made readily apparent from the following description of preferred embodiment examples thereof, provided purely by way of a non-limiting example, with reference to the accompanying figures, in which:

FIG. 1' shows a perspective view with separate parts of the valve group comprised in the filtering assembly object of the present invention, shown in FIG. 1;

FIGS. 1a and 1b show a front view of the valve group shown in FIG. 1 in a front view and a longitudinal section, respectively;

FIGS. 2a and 2b show a front view of the valve group shown in FIG. 2 in a front view and a longitudinal section, respectively;

FIGS. 4a and 4b show a front view of the valve group shown in FIG. 4 in a front view and a longitudinal section, respectively;

FIG. 6 shows a diagram showing the percentage amount of oil that flows towards the heat exchanger or towards the filtering device according to the temperature detected by the temperature sensitive device of the oil filtering assembly, applied to small-sized motor vehicles.

DETAILED DESCRIPTION

Figure 1:
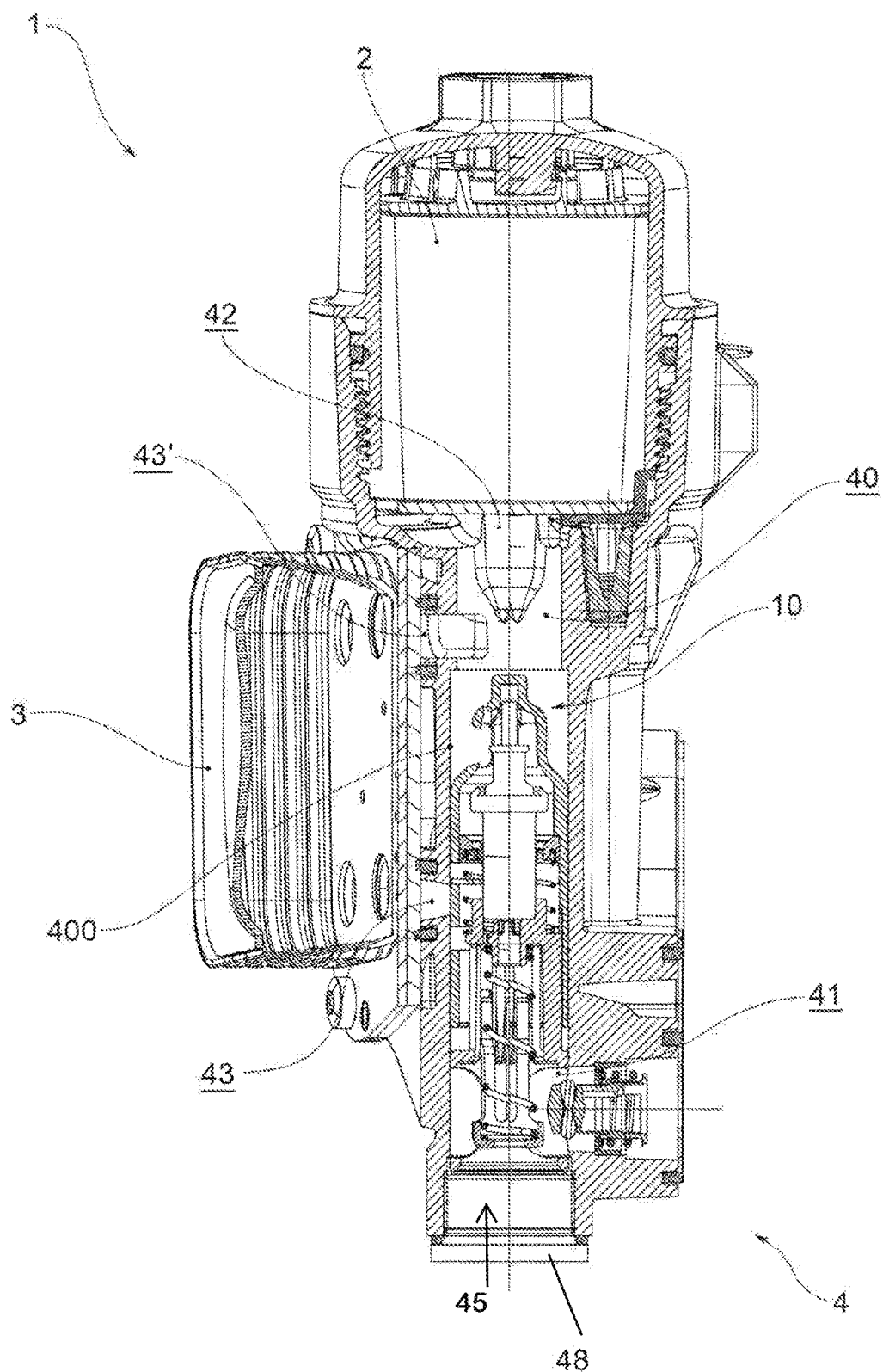
FIG. 1 shows a sectional view of an oil filtering assembly according to a preferred embodiment, wherein the valve group comprised therein is placed in a venting configuration.
Figure 1:
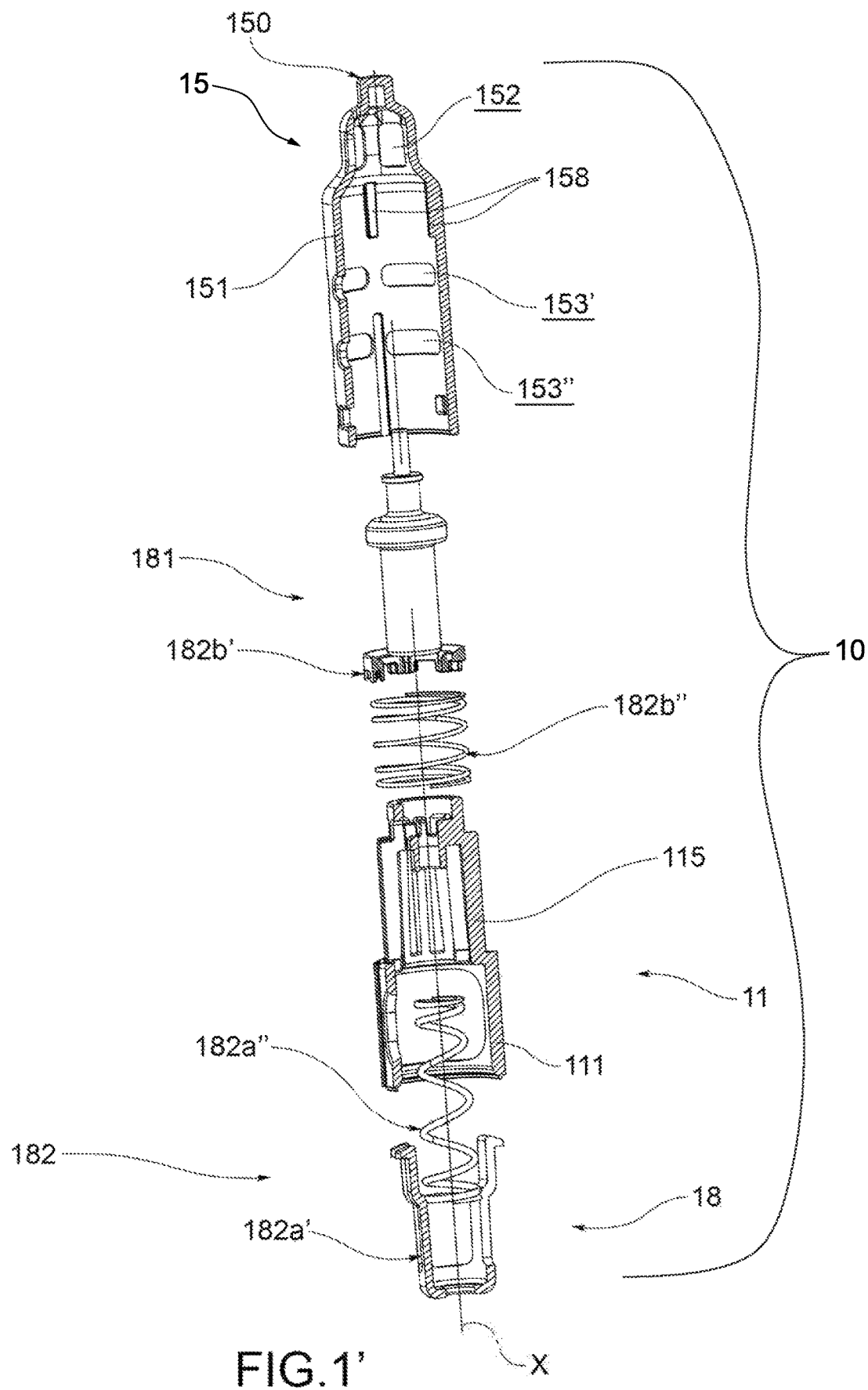

With reference to the accompanying figures, reference numeral 1 indicates an oil filtering assembly for filtering a predefined quantity of oil in the engine of a vehicle. In other words, the filtering assembly 1 is mountable, for example by means of a specially shaped flange, to the engine of a motor vehicle, to be fluidically connected thereto.

The filtering assembly 1 comprises an oil filtering device 2. In a preferred embodiment, the oil filtering device 2 comprises a filtering partition tubular in shape and two support plates, upper and lower, which are fixed to the opposite ends of the filtering partition.

The filtering assembly 1 comprises a heat exchanger 3. In a preferred embodiment, the heat exchanger 3 is of the type with plates adapted to delimit an alternating succession of passage channels for the coolant (e.g. water) and for the oil, so that the oil in contact with the plates carries out a heat exchange to or from them, increasing or decreasing its temperature.

Moreover, the filtering assembly 1 comprises a support body 4 for the filtering device 2 and the heat exchanger 3. The support body 4 is attachable to the engine, for example by means of a specially shaped flange.

Moreover, the support body 4 comprises at least one duct 40 having at least an inlet mouth 41 through which the oil flows from the engine and at least one outlet mouth 42 through which the oil flows to the filtering device 2. In other words, duct 40 is adapted to receive a predefined quantity of inlet oil coming from the engine to bring it, in output, to the oil filtering device 2.

The at least one return duct in turn comprised in the support body 4 which allows the reverse path of the filtered oil from the filtering device to the engine is not an object of the present invention and is not described herein.

Duct 40 has at least one exchanger mouth 43 on the side wall 400 which delimits it through which the oil flows in the heat exchanger 3.

Preferably, moreover, on the side wall 400, duct 40 also has at least one exchanger outlet mouth 43' through which the oil coming from the heat exchanger 3 flows.

In the present description, portions of the duct or components, for example comprised in the valve group described hereinafter, housed therein, close to the inlet mouth 41, are identified as "proximal" while "distal" identifies the portions of the duct or components described hereinafter which are closer to the outlet mouth 42.

Preferably, the exchanger mouth 43 is proximal with respect to the exchanger outlet mouth 43', that is to say, the exchanger mouth 43 is upstream of the exchanger outlet mouth 43'.

According to a preferred embodiment, the oil filtering assembly 1 comprises a valve group 10 housed in duct 40, which extends in length along an axis X-X.

Preferably, duct 40 extends at least in its proximal section along said axis X-X so that the side wall 400 has a radial extension with respect to axis X-X.

According to a preferred embodiment, the valve group 10 comprises a valve body 11 which extends along axis X-X axially fixed to the support body 4. Preferably, the valve body 11 is, in fact, adapted to engage the side wall 400 so as to be axially fixed to the support body 4. Preferably, the valve body 11 comprises a locking portion 111 in proximal position adapted to engage the side wall 400 of duct 40, for example with forced coupling.

Moreover, the valve group 10 comprises an obturator 15, which extends along axis X-X fitted, axially movable, on the valve body 11. Preferably, according to the position of obturator 15, the oil is directed towards the oil filtering device 2 or towards the heat exchanger 3.

In a preferred embodiment, obturator 15 has a primary obturator opening 153' and a secondary obturator opening 153" axially spaced from each other through which the oil flows towards the heat exchanger 3 when positioned respectively facing the exchanger mouth 43, in a first operating configuration and a third operating configuration. Moreover, obturator 15 comprises a filter opening 152 through which the oil flows towards the filtering device 2, with obturator 2 placed in a second operating configuration and/or in a venting configuration. According to a preferred embodiment, the filter opening 152 is placed in a distal position, preferably at one end of obturator 15.

Preferably, obturator 15 has a hollow shape, axial-symmetric, having a tip 150 at its end and obturator walls 151 along axis X-X. The filter opening 152 is thus formed on said tip 150.

In other words, the valve body 11 comprises an obturator portion 115 on which obturator 15 is adapted to be fitted. Preferably, the obturator portion 115 is also adapted to act as a support for obturator 15 in the axial movements thereof; in other words, obturator 15 slides axially on said obturator portion 115, in such a way that the locking portion 111 also performs the function of end of stroke.

Preferably, the valve body 11 is provided internally with a plurality of passages for the oil, in such a way that the oil flows within to the valve body 11, thereby filling the interior of obturator 15 to flow and exit through the above outlets.

According to a preferred embodiment, the valve group 10 comprises obturator positioning and movement means 18 adapted to control the movement of obturator 15 at the occurrence of specific oil conditions. Moreover, the obturator positioning and movement means 18 are adapted to retain or return, as shown hereinafter, obturator 15 in a first operating configuration or basic configuration.

In particular, the obturator positioning and movement means comprise a temperature sensitive device 181 engaging both obturator 15 and the valve body 11, thereby allowing or preventing the passage of oil through the filter opening 152 or the primary obturator opening 153' or the secondary obturator opening 153", moving obturator 15 as a function of the oil temperature. In other words, as described hereinafter, obturator 15 is engaged by said temperature sensitive device 181 and controlled thereby in a predefined axial position in which the oil flows through the filter opening 152 or the primary obturator opening 153' or the secondary obturator opening 153".

Moreover, the obturator positioning and movement means 18 comprise a pressure sensitive device 182 adapted to maintain obturator 15 in an axial position corresponding to the first operating configuration and to allow the movement thereof, as a function of the oil pressure, with respect to the temperature sensitive device 181 so as to allow the oil passage through the filter opening 152. Namely, as described hereinafter, obturator 15 is engaged by said pressure sensitive device 182 in such a manner as to be maintained or returned in the first operating configuration in which the oil flows through the first obturator opening 153'; moreover, the pressure sensitive device is adapted to allow the movement of obturator 15 in a predefined axial position in which the oil flows through the filter opening 152, in which, in fact, the temperature sensitive device 181 does not engage obturator 15, thereby allowing the oil to flow through the filter opening 152.

Figure 2:
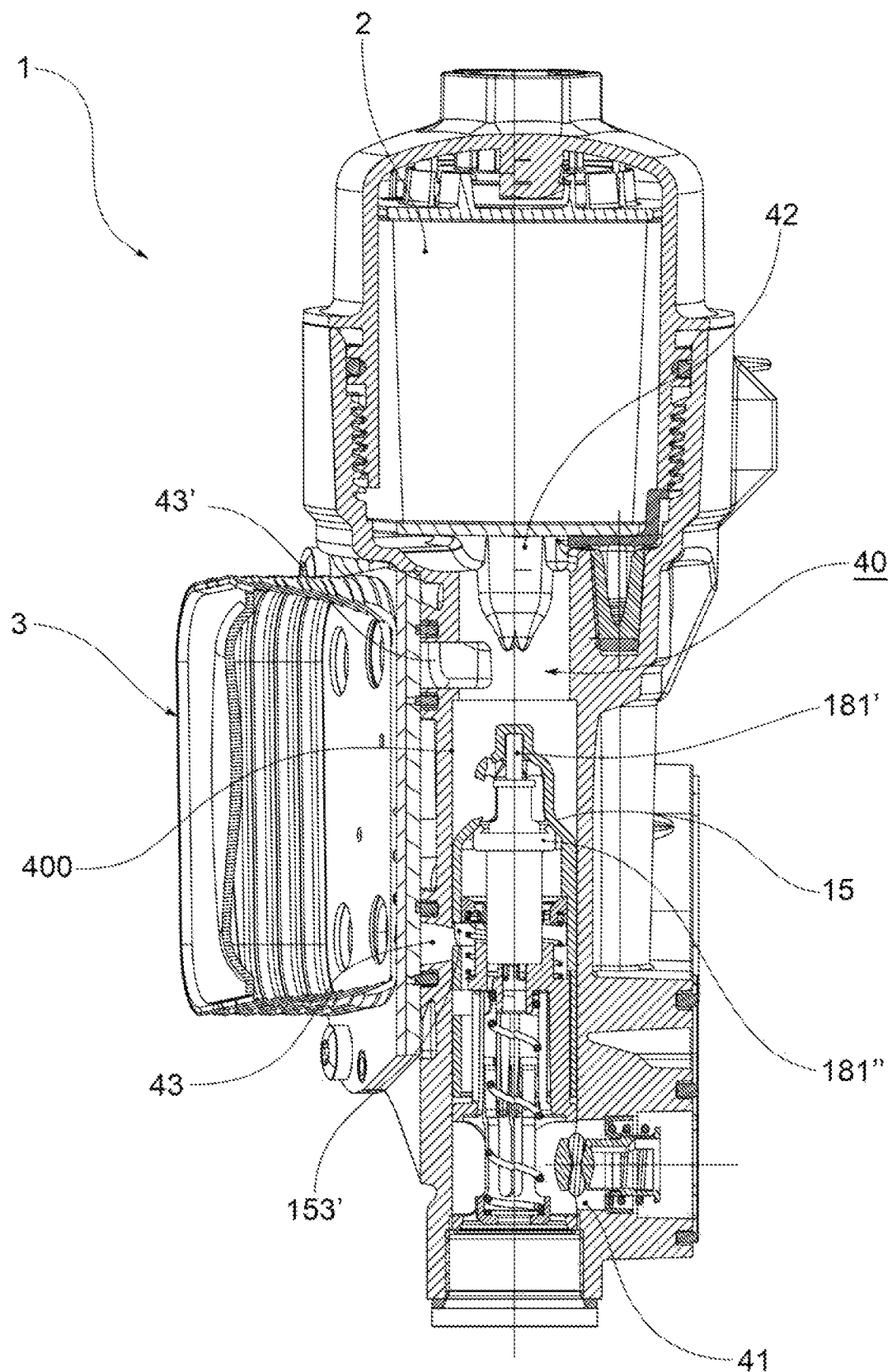
FIG. 2 shows a sectional view of the oil filtering assembly in FIG. 1, wherein the valve group comprised therein is placed in a first operating configuration.
Figure 3:
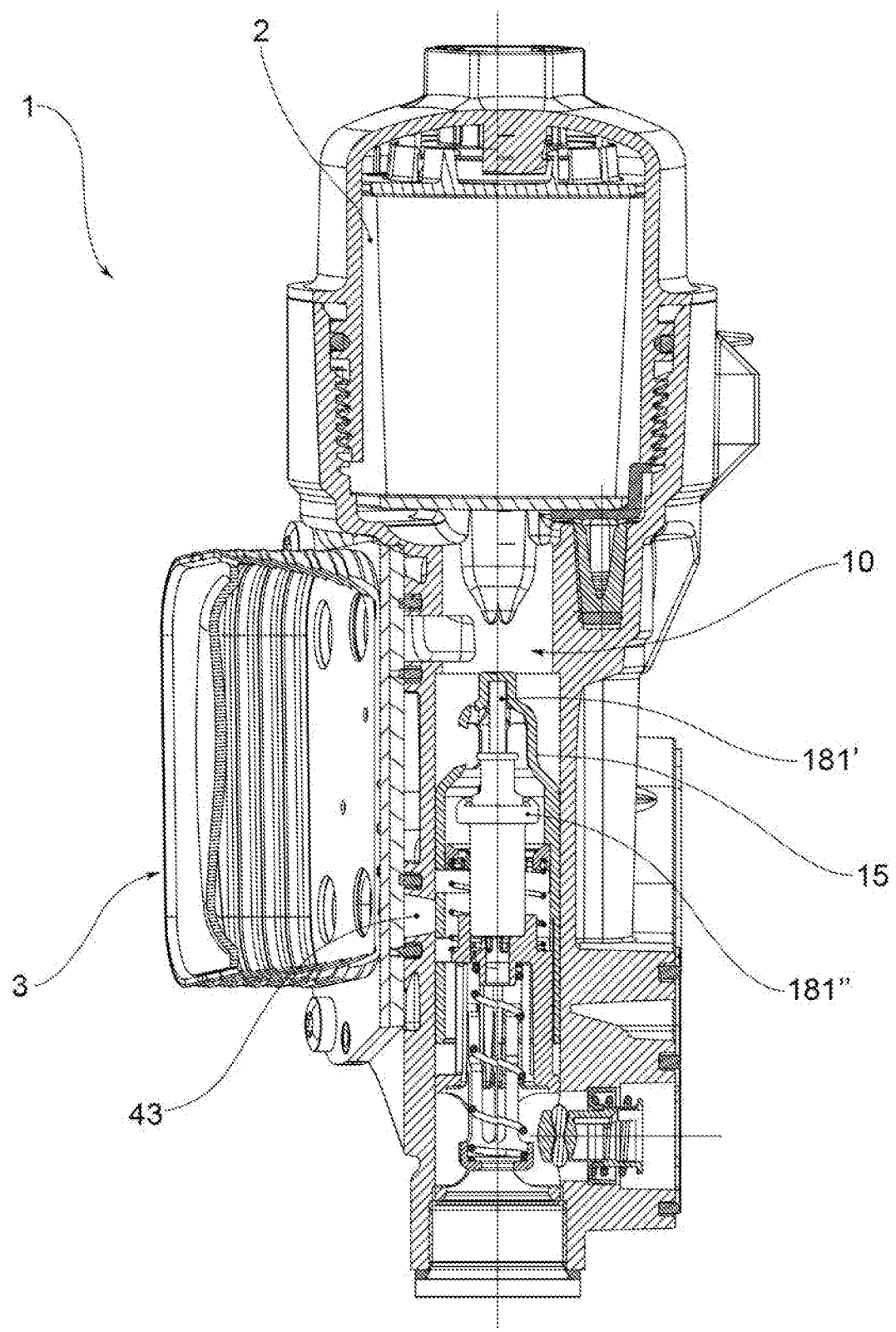
FIG. 3 shows a sectional view of the oil filtering assembly in FIG. 1, wherein the valve group comprised therein is placed in a second operating configuration.
Figure 3B:
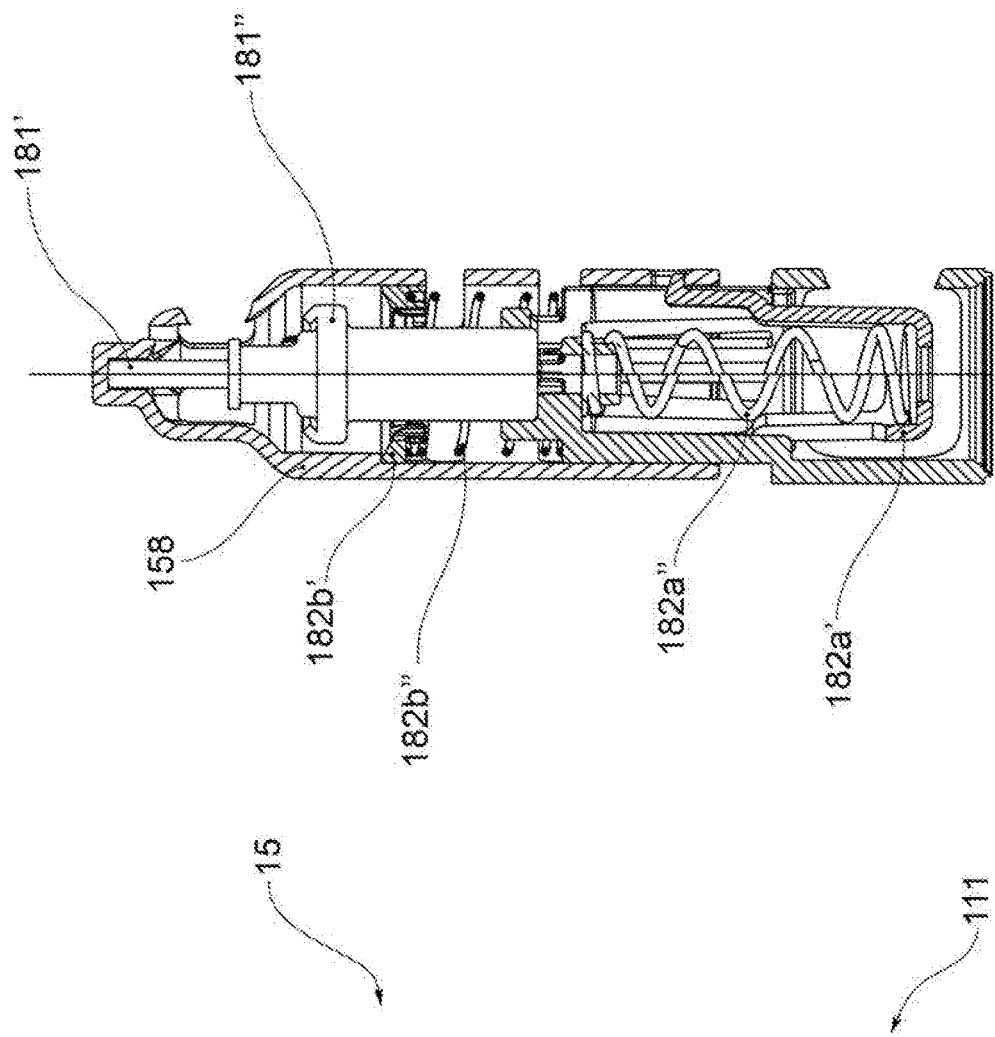
FIGS. 3a and 3b show a front view of the valve group shown in FIG. 3 in a front view and a longitudinal section, respectively.
Figure 3A:
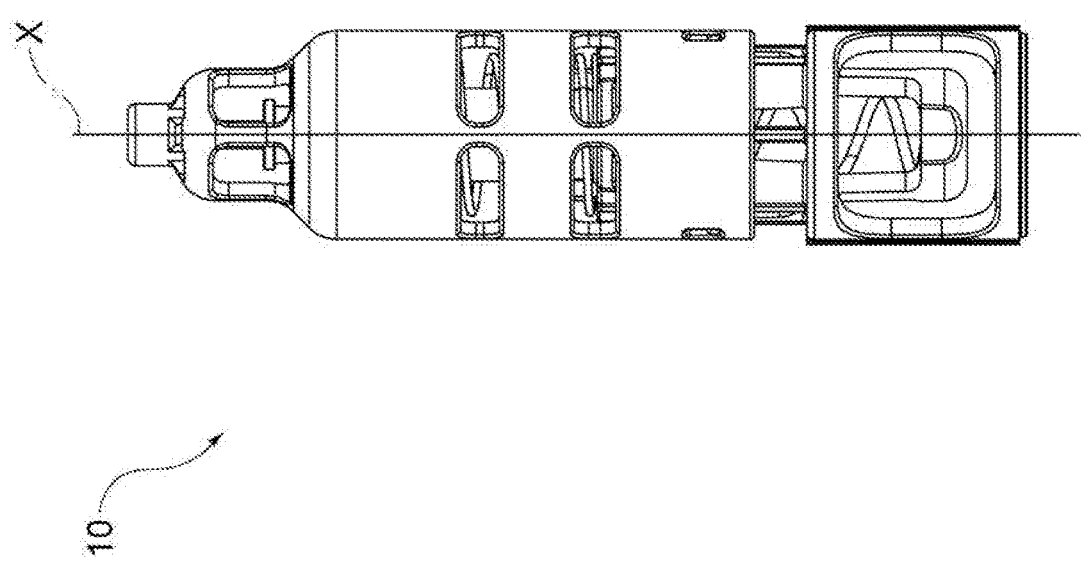
Figure 4:
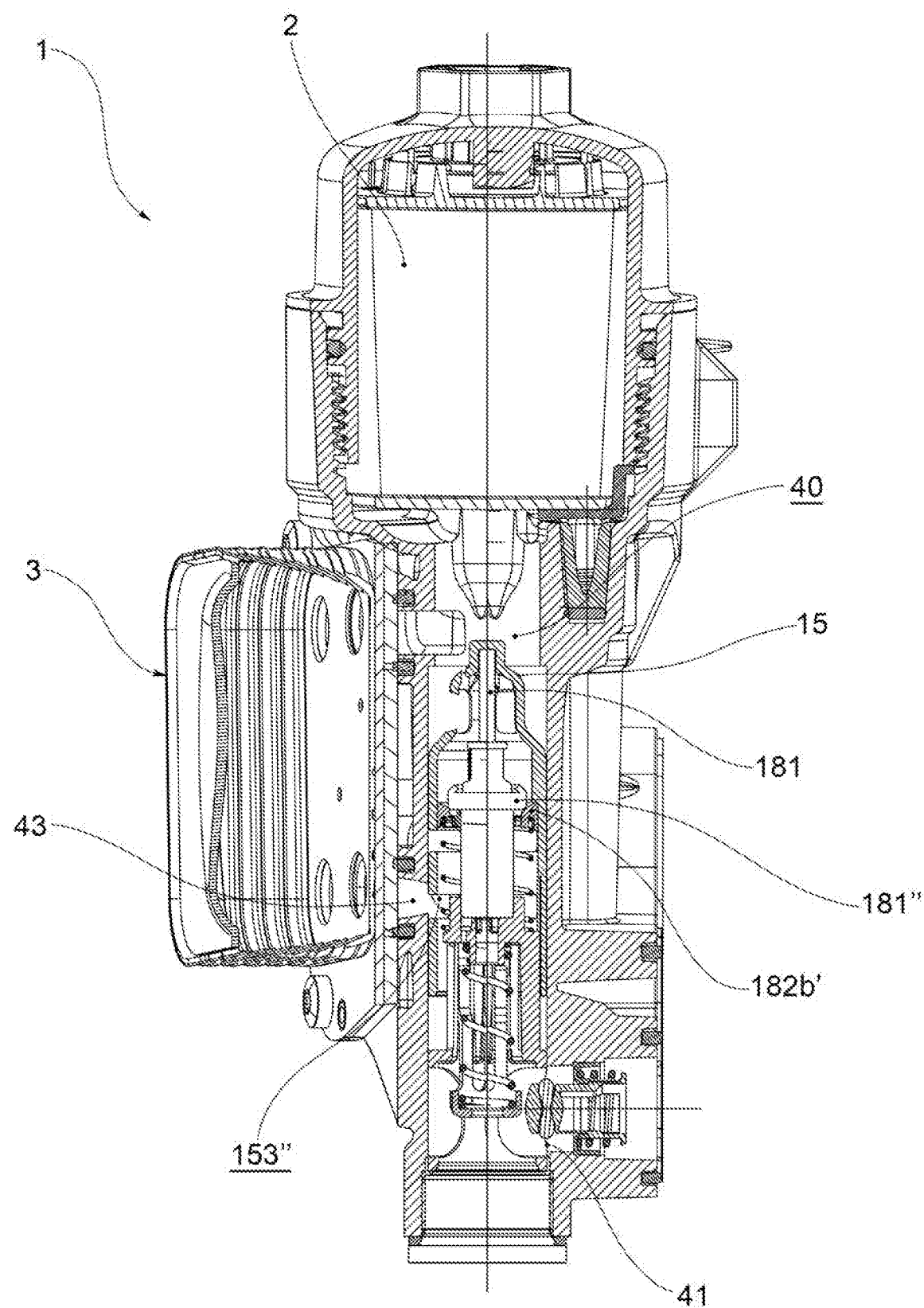
FIG. 4 shows a sectional view of the oil filtering assembly in FIG. 1, wherein the valve group comprised therein is placed in a third minimum operating configuration.
Figure 5:
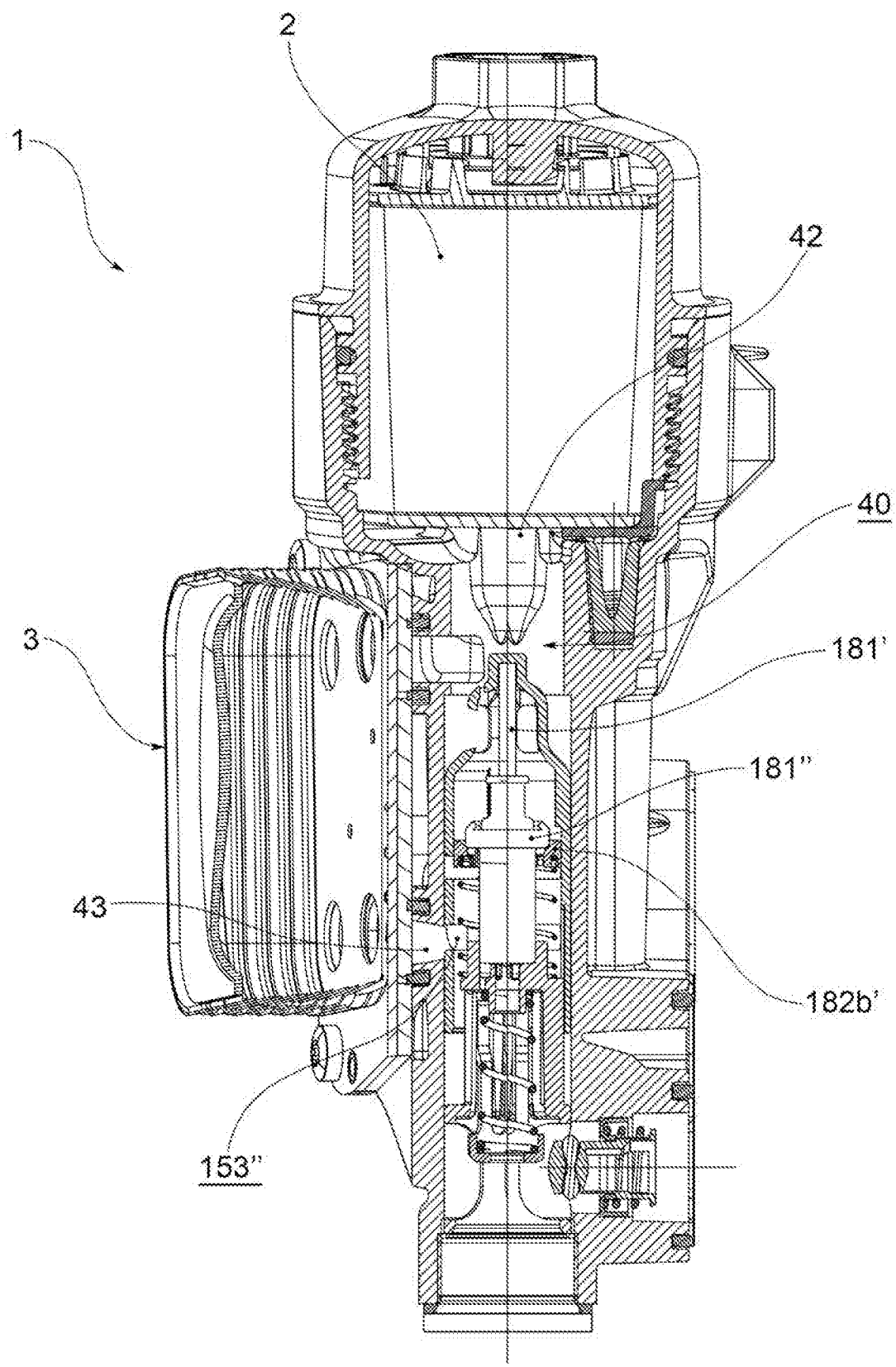
FIG. 5 shows a sectional view of the oil filtering assembly in FIG. 1, wherein the valve group comprised therein is placed in a third maximum operating configuration.
Figure 5B:
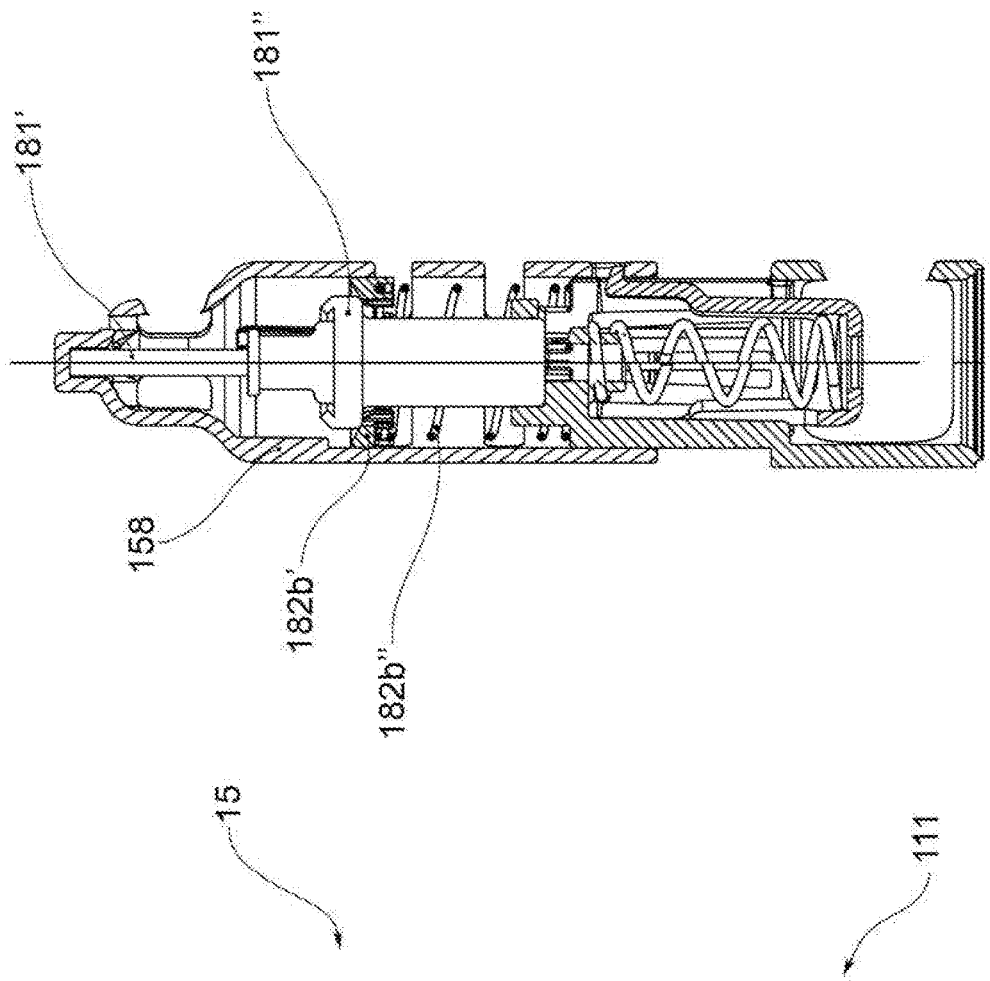
FIGS. 5a and 5b show a front view of the valve group shown in FIG. 5 in a front view and a longitudinal section, respectively.
Figure 5A:
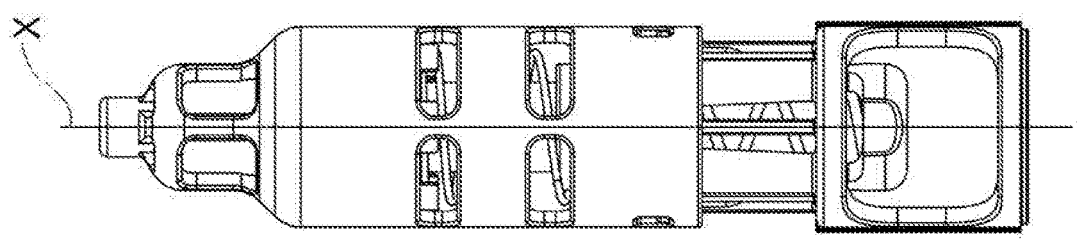

Preferably, due to and by means of, the obturator positioning and movement means 18, obturator 15 is positioned in a plurality of positions corresponding to respective operating configurations of the valve group 10; said configurations comprise:

a first operating configuration, or basic configuration, or oil heating configuration, in which obturator 15 is in an axial position in which the primary obturator opening 153' is positioned facing the exchanger mouth 43 and the temperature sensitive device 181 engages obturator 15 to prevent the oil passage through the filter opening 152; preferably, in this configuration, obturator 15 is in a proximal position in abutment on the locking portion 111; preferably, the obturator positioning and movement means 18 are adapted to maintain or return obturator 15 in such a position when it is not moved in the positions described hereinafter (such a configuration is shown in a non-limiting example in FIG. 2);

a second operating configuration, or configuration with hot oil, in which obturator 15 is in an axial position in which neither the primary obturator opening 153' nor the secondary obturator opening 153" are positioned facing the exchanger mouth 43 (in fact, the wall of obturator 15 is positioned in front of it), in which obturator 15 is spaced apart from the temperature sensitive device 181 in such a manner that the oil flows through the filter opening 152; preferably, in this configuration, obturator 15 is in a distal position with respect to its axial position of the first operating configuration (such a configuration is shown in a non-limiting example in FIG. 3);

a third operating configuration, or oil cooling configuration, in which obturator 15 is in an axial position in which the secondary obturator opening 153" is positioned facing the exchanger mouth 43 and the temperature sensitive device 181 engages the pressure sensitive device 182 in such a way as to prevent the oil passage through the filter opening 152; preferably, in this configuration, obturator 15 is in a distal position with respect to its position of the second operating configuration; preferably, the third operating configuration identifies a third minimum operating configuration, in which the exchanger mouth 43 and the secondary exchanger opening 153" are partially facing, and in a third maximum operating configuration, in which the exchanger mouth 43 and the secondary exchanger opening 153" are fully facing (such configurations are shown in two non-limiting examples in FIGS. 4 and 5);

a venting configuration, in which due to the pressure sensitive device 182, obturator 15, on the action of the pressurised oil that overcomes the action of said pressure sensitive device 182, is arranged in a distal position in which neither the primary obturator opening 153' nor the secondary obturator opening 153" are positioned facing the exchanger mouth 43 (in fact, the wall of obturator 15 is positioned in front of it), and in which obturator 15 is spaced apart from the temperature sensitive device 181 in such a manner that the oil flows through the filter opening 152; preferably, in this configuration, obturator 15 is in a distal position with respect to its axial position of the first operating configuration (such a configuration is shown in a non-limiting example in FIG. 1).

Preferably, an oil operating temperature range is identified, delimited by a lower threshold temperature value Tinf and a higher threshold temperature value Tsup. In other words, the oil temperature value measured is lower than the lower threshold temperature value Tinf, comprised within the range of operating temperatures, or greater than the upper threshold temperature value Tsup. Preferably, such a range of operating temperatures is identified as between 95° C. and 125° C., preferably 98° C. and 110° C.

Moreover, an optimal temperature range is also identified in which the oil is at an optimal temperature for the engine operation. Preferably, the optimal temperature range is adjacently higher (greater than the upper threshold temperature value Tsup) than the operating temperature range. For example, preferably, the optimal temperature range has a value of between 125° C. and 150° C.

According to the above, the first operating configuration corresponds to the situation where the oil is at a temperature lower than the temperatures of the operating temperature range, i.e. lower than the lower threshold temperature value Tinf; in such a situation, the oil is forced to flow into the heat exchanger 3 and is heated to be brought to a higher temperature.

If, on the other hand, the oil in duct 40, coming from the engine, is detected by the temperature sensitive device 181 as being at a temperature within said range of operating temperatures, the valve group 10 is placed in the second operating condition, letting the oil flowing directly towards the filtering device 2 and then to the engine. Preferably, in such a configuration, the oil passage in the heat exchanger 3 is prevented, thus accelerating the achievement, by the oil, of a temperature having a value that is within the range of temperatures.

The third operating configuration corresponds to the situation where the oil is detected by the temperature sensitive device 181 as being at a higher temperature than the temperature of the range of operating temperatures, i.e. higher than the upper threshold temperature value Tsup, in other words at a temperature within the optimal temperature range. Contrary to the situation in which the oil is at a lower temperature than that defined by the range of operating temperatures, by passing into the heat exchanger 3, the oil is cooled in order to be maintained in such a range of optimal temperatures while avoiding a constant raising thereof of the temperature, thus allowing the engine to continue to operate in an optimal condition.

Preferably, transient operating temperature ranges are also identified, which correspond to mixed configurations, in which a quantity of oil flows through the primary obturator opening 153' or the secondary obturator opening 153" towards the heat exchanger 3, while the remaining quantity of oil flows through the filter opening 152, towards the filtering device 2. For example, a transient configuration, in which obturator 15 is axially placed so that the oil flows through both the primary obturator opening 153' and the filter opening 152 occurs at an oil temperature ranging between 85° C. and 95° C.-98° C. Or by way of example, a second transient configuration, in which obturator 15 is axially placed so that the oil flows through both the secondary obturator opening 153" and the filter opening 152, occurs at an oil temperature of between 110° C.-115° C. and 125° C.

FIG. 6 shows the graph of the quantity (as a percentage) of oil that flows towards the heat exchanger 3 or towards the filtering device 2 as a function of its temperature. The above temperatures and the above temperature ranges as well as FIG. 6, relate to specific automotive applications for motor vehicles, typically of medium size, in fact these temperature values for industrial vehicles tend to be lower than those cited above.

According to a preferred embodiment, excessive oil pressure peaks, typically found at a cold temperature, i.e. lower than the lower threshold temperature value, may correspond to a potential damage to the valve group 10 and/or the heat exchanger 3, if the oil flows towards it.

Using the pressure sensitive device 182, however, under the action of a pressure peak obturator 15 is moved axially to the venting configuration so that the oil flows towards the filter opening 152 and the pressure action is not released on the valve group 10 and/or the heat exchanger 3. Preferably, therefore, a threshold pressure value is defined above which the movement of obturator 15 is induced; for example, such a threshold pressure value is 2 bar.

According to a preferred embodiment, the temperature sensitive device 181 is housed on the valve body 11, preferably on the distal end of the obturator portion 115.

Preferably, the temperature sensitive device 181 distally comprises a control portion 181' engaging obturator 15, which changes its shape along axis X-X depending on the oil temperature. Preferably, the control portion 181' lies on axis X-X and engages obturator 15 at the centre of tip 150 thereof.

According to a preferred embodiment, the temperature sensitive device 181 contains a wax body of changeable shape, preferably adapted to change the height of the control portion 181'.

Preferably, moreover, the temperature sensitive device 181 comprises a stopper protrusion 181" suitable to engage obturator 15 in the first operating configuration and to engage the pressure sensitive device 182 in the third operating configuration, thereby preventing the passage of oil towards the filter opening 152.

In other words, the stopper protrusion 181" has a radial extension. Preferably, the stopper protrusion 181" has axial-symmetric shape. Preferably, the stopper protrusion 181" is a radial ring adapted to distally engage obturator 15 (at its interior) for example close to tip 150, and adapted to proximally engage the pressure sensitive device 182 described hereinafter, thereby obstructing the passage of the oil flow towards the filter opening 152.

According to a preferred embodiment, the pressure sensitive device 182 works with the valve body 11, with obturator 15 and with the temperature sensitive device 181.

Preferably, the pressure sensitive device 182 comprises engagement means 182a, for example housed in a proximal position, engaging the valve body 11 and obturator 15 to keep obturator 15 in the first operating configuration, and allow the movement of obturator 15 into the venting configuration when stressed by the action of the pressurised oil.

Preferably, the retention means 182a comprise a retention portion 182a' integrally connected to obturator 15 and an elastic retention body 182a" placed between the retention portion 182a' and the valve body 11 so as to exert upon them an axial thrust action in the proximal direction.

According to a preferred embodiment, the retention portion 182a' is fixed snap-wise to obturator 15, for example to the obturator wall 151 in its proximal end opposite to the obturator 15 tip.

In a preferred form of embodiment, the retention means 182a are adapted to extend along axis X-X, so as to house in the base portion 111, in the first operating configuration.

According to a preferred embodiment, said elastic retention body 182a" is a helical spring operating between the retention portion 182a' and the valve body 11. Preferably, the retention portion 182a' has a substantially hollow or U or C shape, in such a way that it engages obturator 15 by its arms and is shaped for housing the elastic retention body 182a" at its interior.

According to a preferred embodiment, moreover, the pressure sensitive device 182 comprises engagement means 182b, preferably housed in a distal position, engaging the valve body 11 and obturator 15 and/or the temperature sensitive device 181 to keep obturator 15 in the third operating configuration, and permit the movement of the obturator into the venting configuration when stressed by the action of the pressurised oil, for example higher than the threshold pressure value.

Preferably, in fact, the engagement means 182b comprise an abutment element 182b' suitable to engage obturator 15 and/or the temperature sensitive device 18 and an elastic thrust body 182b" placed between the abutment element 182b' and the valve body 11, wherein the elastic thrust body 182b" is adapted to perform on them an axial thrust action in the distal direction.

In other words, the engagement means 182b operate in the opposite direction with respect to the holding retention means 182a.

Therefore, if the oil pressure has value greater than a predefined threshold pressure value, in other words has an overpressure value, obturator 15 undergoes the action of the elastic thrust body 182" and of said pressure, thus overcoming the thrust action of the elastic retention body 182a" which is then axially compressed.

In other words, also the engagement means 182b are in turn subject to the pressure action, in fact if the oil pressure has value greater than the threshold pressure value, obturator 15 under the oil action moves axially, pushed by the retention body 182b' in turn pushed by the elastic thrust body 182b" which thus is axially stretched.

Preferably, the abutment element 182b' has substantially axial-symmetric shape, for example as a ring, with respect to axis X-X in a manner such that it is adapted, in the first operating configuration, in the second operating configuration and in the venting configuration to externally engage the obturator wall 151 which comprises a special abutment step 158. While in the third operating configuration, the abutment element 182b' is shaped so as to be internally engageable by the temperature sensitive device 181, in particular by the stopper protrusion 181".

According to a preferred embodiment, the elastic thrust body 182b" is a helical spring operating between the abutment element 182b' and the valve body 11.

Preferably, the elastic retention body 182a" is less yielding than the elastic thrust body 182b", in such a way that, with the oil at a temperature below the lower threshold temperature value and at a pressure lower than the threshold pressure value, the valve group 10 is maintained in the first operating configuration (see FIG. 2).

According to a preferred embodiment, the valve group of the present invention has a substantially axial-symmetrical structure in its components, for example the obturator openings or the filter opening extend by a radial circumference section, or again for example, the valve body 11 has an axial-symmetric extension. Preferably, at the same axial height, in a preferred embodiment, a plurality of radial openings, for example four in number, are identified.

According to a preferred embodiment, the valve group is insertable and removable, in cartridge way, from inside duct 40. For example, the support body 4, has an access mouth 45, preferably located along axis X-X, through which the valve group 10 is insertable or removable. Preferably, the support body 4 comprises a stopper 48 suitable to close the access mouth 45 and at the same time suitable to act as axial stop for the valve group 10.

An object of the present invention is also a valve group 10 for controlling the passage of oil in an oil filtering assembly 1. In other words, an object of the present invention is also a valve group 10 having the features described above, adapted to be inserted in a support body 4, in turn having the features and components described above.

Innovatively, the oil filtering assembly and/or the valve group which are housable in the support body of a filtering assembly widely achieve the object of the present invention, overcoming the typical drawbacks of the prior art.

Advantageously, in fact, the oil filtering assembly is adapted to operate with the engine in such a way as to make the latter work at its optimal operating conditions. In particular, through the management of the passage of oil through the heat exchanger, the oil is heated in such a way that it is returned filtered to the engine, but especially at the optimal temperature.

In fact, advantageously, in an operating condition corresponding to the cold engine in which the oil temperature is too low, the oil filtering assembly, in the shortest possible timing, heats the oil until it is brought to an optimal temperature range, switching from the first to the third operating configuration. In other words, advantageously, the valve group is adapted to control the oil as a function of its temperature in such a manner as to accelerate a reheating thereof, and thus accelerate the heating step of the engine itself.

Advantageously, the oil is also maintained in the optimal temperature range due to the third operating configuration; in fact, the third operating configuration is also adapted to prevent a further rise in temperature in such a way that, once achieved, it is maintained in the optimal temperature range; for example, to this end, the filtering assembly is adapted to configure the valve group in the third minimum operating configuration or in the third maximum operating configuration, as a function of the oil temperature.

Advantageously, the valve group, the heat exchanger and other components are protected from any damage due to pressure peaks. The oil pressure peaks are effectively managed by the valve group, which allows venting such a pressure, thus safeguarding the valve group itself from any damage, but also preserving the heat exchanger that is in fact bypassed by the oil. Preferably, this condition is effectively managed in the operating situation with cold engine, thus cold oil, typically characterised by frequent pressure peaks.

A still further advantageous aspect lies in the fact that the valve group is simple and cost-effective to manufacture.

Moreover, advantageously, the valve group is extremely versatile in its application. In fact, the valve group is easily calibrated by specially selecting the elastic retention body and the elastic thrust body, in particular by carefully selecting their elastic modulus and their size and strokes, so as to effectively manage the reaction of the obturator positioning and movement means and the axial strokes of the obturator itself. Advantageously, therefore, the valve group, depending on the final application of the oil filtering assembly, for example on small or medium sized motor vehicles or on industrial vehicles, has the same components mentioned above, changing only in its elastic components from an application the other.

Advantageously, the temperature sensitive device is completely wet by the oil, thus being ready to immediately react as a function of a change in the oil temperature.

Moreover, advantageously, no specific design of the duct is required since the valve group autonomously operates on oil; in other words, advantageously, it is not necessary to provide the duct with specific shoulders at the different obturator positions, since the valve group autonomously performs the described positions.

It is clear that a man skilled in the art may make changes to the filtering assembly in order to meet incidental needs, all falling within the scope of protection defined in the following claims.

LIST OF REFERENCE NUMERALS 1 oil filtering assembly
2 oil filtering device
3 heat exchanger
4 support body
40 duct
41 inlet mouth
42 outlet mouth
43 exchanger mouth
43 exchanger outlet mouth
45 access mouth
48 stopper
400 side wall
10 valve group
11 valve body
111 locking portion
115 obturator portion
15 obturator
150 obturator tip
151 obturator walls
152 filter opening
153' first exchanger opening
153" second exchanger opening
158 abutment step
18 obturator positioning and movement means
181 temperature sensitive device
181' control portion
181" stopper protrusion
182 pressure sensitive device
182a retention means
182a' retention portion
182a" elastic retention body
182b bypass means
182b' abutment element
182b" elastic thrust body

The invention claimed is:

1. A valve group housable in a duct of an oil filtering assembly for filtering a predefined quantity of oil of an engine of a vehicle, said assembly comprises a heat exchanger, an oil filtering device and a support body, the support body being fixable to the engine comprising said duct, said duct has at least one inlet mouth through which oil flows from the engine and at least one outlet mouth through which the oil flows towards the filtering device, an access mouth through which the valve group is insertable and removable, and has on a side wall which delimits said duct, at least one exchanger mouth through which the oil flows into the exchanger;

wherein the valve group is configured as a cartridge insertable and removable from inside the duct, and extends in length along an axis, comprising:
a valve body which extends along the axis axially fixed to the support body;
an obturator extending along the axis fitted axially movably in the valve body, the obturator having a proximal end nearer the access mouth and a distal end nearer the at least one outlet mouth, the obturator comprising:
a primary obturator opening and a secondary obturator opening axially spaced from each other through which the oil flows towards the heat exchanger when positioned respectively facing the at least one exchanger mouth, in a first operating configuration and a third operating configuration;
a filter opening at the distal end of the obturator through which the oil flows towards the filtering device when the obturator is placed in a second operating configuration and in a venting configuration;

means for obturator positioning and moving comprising:
a temperature sensitive device engaging the obturator to guide the obturator, depending on oil temperature, into an axial position corresponding to the second operating configuration or the third operating configuration;
a pressure sensitive device configured to keep the obturator in an axial position corresponding to the first operating configuration and to allow movement of the obturator, depending on oil pressure, in an axial position corresponding to the venting configuration.

2. The valve group according to claim 1, wherein the third operating configuration identifies a third minimum operating configuration, in which the at least one exchanger mouth and the secondary obturator opening are partially facing each other, and a third maximum operating configuration in which the at least one exchanger mouth and the secondary obturator opening face each other entirely, in which the temperature sensitive device allows the movement of the obturator in said third minimum operating configuration and in said third maximum operating configuration, depending on the oil temperature.

3. The valve group according to claim 1, wherein the temperature sensitive device is housed on the valve body comprising, distally from the valve body, a control portion, engaging the obturator, which changes a shape of the temperature sensitive device along the axis depending on the oil temperature.

4. The valve group according to claim 1, wherein the temperature sensitive device comprises a stopper protrusion having a radial extension, suitable to engage the obturator in the first operating configuration and to engage the pressure sensitive device in the third operating configuration to prevent passage of oil towards the filter opening.

5. The valve group according to claim 1, wherein the temperature sensitive device contains a wax body of changeable shape.

6. The valve group according to claim 1, wherein the pressure sensitive device acts with the valve body, with the obturator and with the temperature sensitive device comprising a retainer housed in a proximal position, engaging the valve body and the obturator to keep the obturator in the first operating configuration, and to allow the movement of the obturator into the venting configuration when stressed by action of the pressurised oil.

7. The valve group according to claim 6, wherein the retainer comprises a retention portion integrally connected to the obturator and an elastic retention body placed between the retention portion and the valve body to exert upon the retention portion and the valve body an axial thrust action in the proximal direction.

8. The valve group according to claim 7, wherein the elastic retention body is a helical spring operating between the retention portion and the valve body.

9. The valve group according to claim 1, wherein the pressure sensitive device comprises an engagement device housed in a distal position, engaging the valve body and the obturator and/or the temperature sensitive device to keep the obturator in the third operating configuration, and permit the movement of the obturator into the venting configuration when stressed by action of the pressurised oil.

10. The valve group according to claim 9, wherein the engagement device comprises an abutment element suitable to engage the obturator and/or the temperature sensitive device and an elastic thrust body placed between the abutment element and the valve body to perform on the abutment element and the valve body an axial thrust action in the distal direction.

11. The valve group according to claim 10, wherein the elastic thrust body is a helical spring operating between the abutment element and the valve body.

12. The valve group according to claim 10, wherein the abutment element has a shape substantially axial-symmetric to the axis and is suitable, in the first operating configuration, in the second operating configuration and in the venting configuration to externally engage the obturator wall which comprises an abutment step and, in the third operating configuration, to be engaged internally by a stopper protrusion of the temperature sensitive device.

13. The valve group according to claim 10, wherein the retainer comprises a retention portion integrally connected to the obturator and an elastic retention body placed between the retention portion and the valve body to exert upon the retention portion and the valve body an axial thrust action in the proximal direction; and wherein the elastic retention body is less yielding than the elastic thrust body.

14. The valve group according to claim 1, wherein the obturator comprises a tip at the distal end and the filter opening is formed on the tip.

15. An oil filtering assembly for filtering a predefined quantity of oil in the engine of a vehicle, comprising:
i) an oil filtering device;
ii) a heat exchanger;
iii) a support body for the filtering device and the heat exchanger, fixable to the engine, comprising at least one duct having at least an inlet mouth through which oil flows from the engine and at least one outlet mouth through which the oil flows towards the filtering device, an access mouth through which the valve group is insertable and removable, wherein the duct has on the side wall which delimits the duct, at least one exchanger mouth through which the oil flows into the exchanger;
iv) a valve group housed in the duct, wherein the valve group is configured as a cartridge insertable and removable from inside the duct, and extends in length along an axis, comprising:
a valve body which extends along the axis axially fixed to the support body;
an obturator extending along the axis fitted axially movably in the valve body, the obturator having a proximal end nearer the access mouth and a distal end nearer the at least one outlet mouth, the obturator comprising:
a primary obturator opening and a secondary obturator opening axially spaced from each other through which the oil flows towards the heat exchanger when positioned respectively facing the at least one exchanger mouth, in a first operating configuration and a third operating configuration;
a filter opening at the distal end of the obturator through which the oil flows towards the filtering device when the obturator is placed in a second operating configuration and in a venting configuration;
means for obturator positioning and moving comprising:

a temperature sensitive device engaging the obturator to guide the obturator, depending on oil temperature, into an axial position corresponding to the second operating configuration or the third operating configuration;

a pressure sensitive device configured to keep the obturator in an axial position corresponding to the first operating configuration and to allow movement of the obturator, depending on oil pressure, in an axial position corresponding to the venting configuration.

16. The oil filtering assembly according to claim 15, wherein the obturator comprises a tip at the distal end and the filter opening is formed on the tip.

* * * * *